United States Patent [19]

Wilson

[11] Patent Number: 5,019,827
[45] Date of Patent: May 28, 1991

[54] PLAT REFERENCE SYSTEM

[76] Inventor: Marlin V. Wilson, Rte. 1, Box 449, Barboursville, Va. 22923

[21] Appl. No.: 285,855

[22] Filed: Dec. 13, 1988

Related U.S. Application Data

[63] Continuation-in-part of Ser. No. 222,365, Jul. 20, 1988, abandoned, which is a continuation of Ser. No. 75,823, Jul. 20, 1987, abandoned.

[51] Int. Cl.$^5$ .......................... G01S 1/08; G06F 15/20
[52] U.S. Cl. ..................................... 342/386; 364/460
[58] Field of Search ............... 342/386, 387, 445, 170; 364/460, 138

[56] References Cited

U.S. PATENT DOCUMENTS

4,017,985  4/1977  Heartz ..................................... 432/2
4,232,313  11/1980  Fleishman ............................ 364/460

*Primary Examiner*—Gregory C. Issing
*Attorney, Agent, or Firm*—Mason, Fenwick & Lawrence

[57] ABSTRACT

A plat reference system for coordinating reception of data from plural information sources and controlling the output of data-signifying energy representing the data from such sources to produce any output presentation for human or machine receptors, including a sensor input resolution unit having rotation translation timing capacity incorporated therein, for receiving information data from plural predetermined spatial locations. A spatial reference unit having spatial reference mathematical information stored therein is provided to apply mathematical functions therefrom to the input resolution unit to translate the input data from the sensors to a spatial referenced correlated form. A plat reference unit supplies a prescribed plat reference to a comparison and encoding unit for comparing the output from the resolution unit to the plat reference to control timing of the output energy to provide the prescribed output presentation.

18 Claims, 6 Drawing Sheets

FIG. 6A ance Control and Timing Unit 102. The digested or
scaled inputs are channeled to the human or machine
output through Display or Other Output Unit 104 in
the order required to be intelligible to the human or
machine output, in accordance with commands from
the time sequence determined by the Spatial Reference
Control and Timing Unit 102. The data accumulated
in Unit 101 is transferred to the output through Spatial
Reference Control and Timing Unit 102.

PLAT REFERENCE SYSTEM

PRIOR RELATED APPLICATIONS

The present application is a continuation-in-part of application Ser. No. 222,365, filed July 20, 1988, abandoned, which was a continuation of application Ser. No. 075,823, filed July 20, 1987, now abandoned.

BACKGROUND AND OBJECTS OF THE INVENTION

PRIOR RELATED APPLICATIONS

The present invention relates in general to systems for coordinating reception of data from plural sources and controlling the timing of output data relating thereto from a common data output unit, and more particularly to plat reference means for receiving data such as mapping, tracking, position and momentum information from a plurality of sources of sensor information and prescribed plat reference means controlling the timing of output data presentation means for presentation of the data to the human reciepient.

Heretofore there have frequently been problems in complex situations involving machines and people in fast changing circumstances for a human operator of a machine or an overseer of many machines and situations to maintain an awareness of the total situation. Typically, the situation may involve multiple types of machines, each performing a variety of functions, sometimes in conjunction with a variety of functions, sometimes in conjunction with a variety of human operators, and frequently in remote locations.

The present invention involves a new and novel means to provide mapping, tracking, position, and momentum information to an observer of similar devices from a viewpoint that is most appropriate to the human being involved to increase clarity in receiving the information. This facility takes place even though distance, speed, numbers of machines and times may vary randomly. It is a further feature of the present invention to provide for non-intefering effects between a plurality of devices sensing such information regardless of location or movement.

More particularly, the present invention is a plat reference system having means for coordinating a common media output unit, presenting information data or media for human monitoring of the information, wherein a common data or media reception unit including a prescribed plat reference controlling the timing of an output of energy or information signals to a common media or presentation device controlling reception of energy from a plurality of information or data sensors. The system may include a second channel common data or media reception unit and output unit with the second channel coordinated with the first channel by compatible alternative plat reference, or the second channel coordination information may be included in the first channel information and the first channel coordination information may be included in the second channel information. The prescribed plat reference may be changed periodically according to a second prescribed pattern.

As another example, the plat reference system of the present invention may include means to control a bi-directional flow through a common media or data presentation means comprising first means to establish a unique location in a multi-dimensional space, means to correlate this location with a plat reference, means to derive a time for sending out of energy presenting such information to an output presentation means, and means to derive a time for reception for energy from a plurality of information or data sensors.

Other objects, advantages and capabilities of the present invention will become apparent from the following detailed description, taken in conjunction with the accompanying drawing.

BRIEF DESCRIPTION OF THE FIGURES

FIGS. 6, 6B are timing diagrams showing plat reference selection of preferred time for output to common media or presentation means in accordance with the present invention;

DESCRIPTION OF A SIMPLIFIED GENERAL EMBODIMENT

Figure 1A:
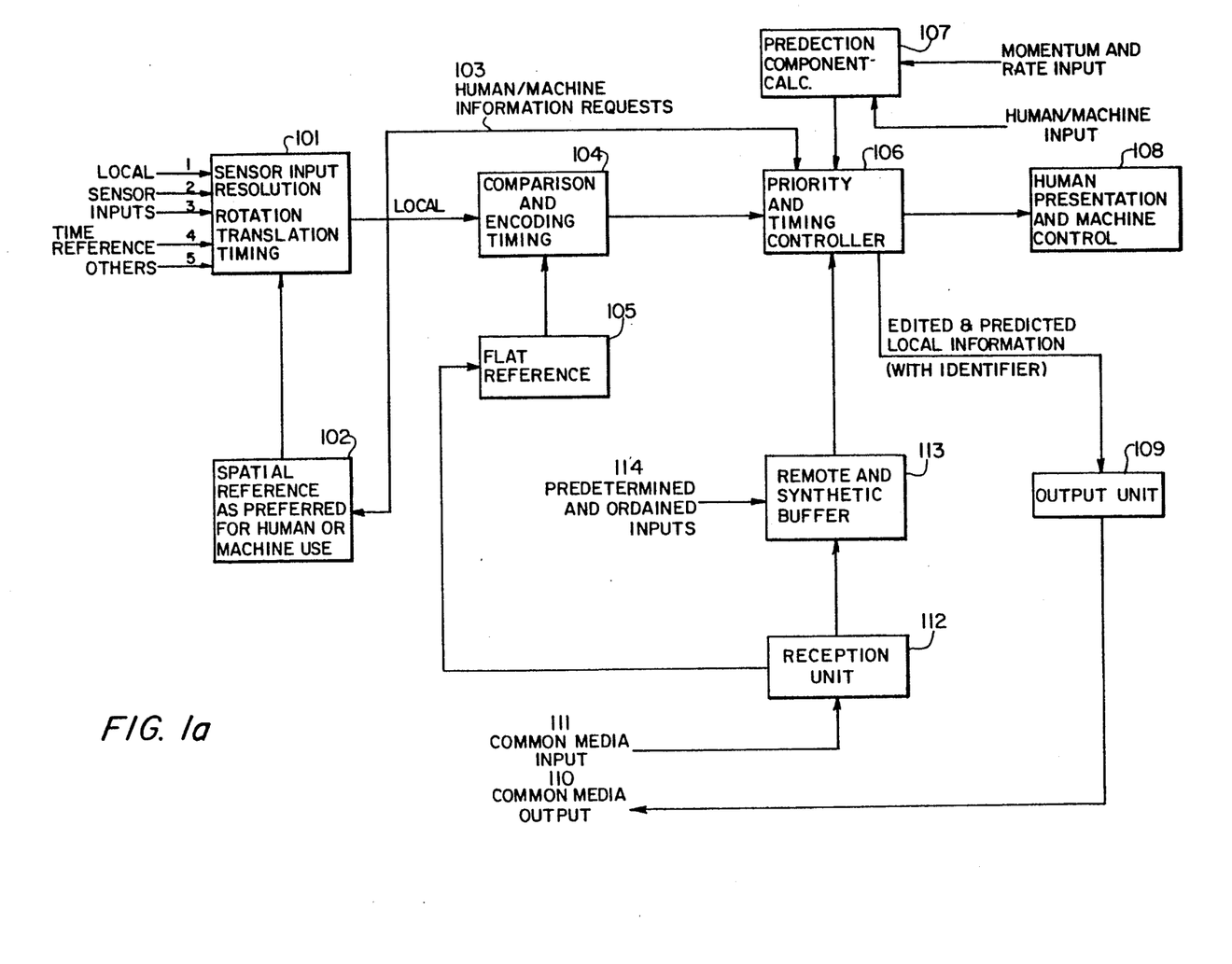
FIG. 1 is a block diagram of a generalized, simplified embodiment of the plat reference system of the present invention.

Referring to the drawing, wherein like reference characters designate corresponding parts throughout the several figures and particularly to the generalized, simplified block diagram of FIG. 1, the simplified example of the plat reference system embodying the present invention employs input means to allow the resolution of mapping or tracking sensors located at a plurality of remote sensing stations, such as sensors which provide measures of distance from wave propagation constants, field strength attenuation functions, or angular resolution information.

Referring particularly to the simplified block diagram of FIG. 1, the invention involves inputs containing unextracted data describing the condition of the block or associated sensor devices, for example indicated at S1, S2, and S3, are brought in to sensor Input Resolution and Rotation Translation Timing Means 101. A plurality of the local or association sensor machines, S1, S2, S3 etc. may be part of a distributed plat reference system, as later described or may be single and operated alone. The local sensor inputs from the local sensor machines S1, S2, S3 etc. may be of any type including vibratory frequencies, time intervals, time rations, modulation patterns, temperature, pressure factors or other information-containing inputs. These undigested inputs are assembled into the format and scale needed by the human/machine output in the Input Resolution Unit 101. This involves reduction of each input to the units and scale needed by the mechanisms as required by the human or machine commands on the Input Information Request Line 103 and scaling factors in Spatial Reference Means 102. The input to 102 is adjusted by the human or controlled machine to suit the desired task at hand at any given moment.

The spatial reference mathematical information is stored in Spatial Reference Means 102 so that only simple human or machine commands are required. Spatial Reference Means 102 provides the mathematical functions needed to extract the required essence of the undigested local inputs. Also the angle of observation, scale, and proportion is provided by Spatial Reference Means 102 in accordance with the input 103.

To be of direct usefulness, either to a human operator or overseer, it is chosen in this embodiment of the invention to resolve the sensor inputs, 101, into the useful components necessary for comparison and processing with the plat reference stored in the local memory. It is also in the device 101, that the axis of the reference of the sensor inputs can be rotated to the desired or most simple orientation for the benefit of the operator or machine control. This can be visualized easily when the plat reference system is carried in a maneuvering vehicle whose momentary direction may frequently vary compared to a navigation related axis such as the cardinal points of the compass.

Likewise, for purposes of human observation and/or machine control, the sensor data may best serve by translating its axis of reference in one or more dimensions to suit the requirements of a given situation. In general, this is done, after rotation, in a digital type system, by adding or subtracting the desired translational values to the coordinates received from the sensors.

Figure 1B:
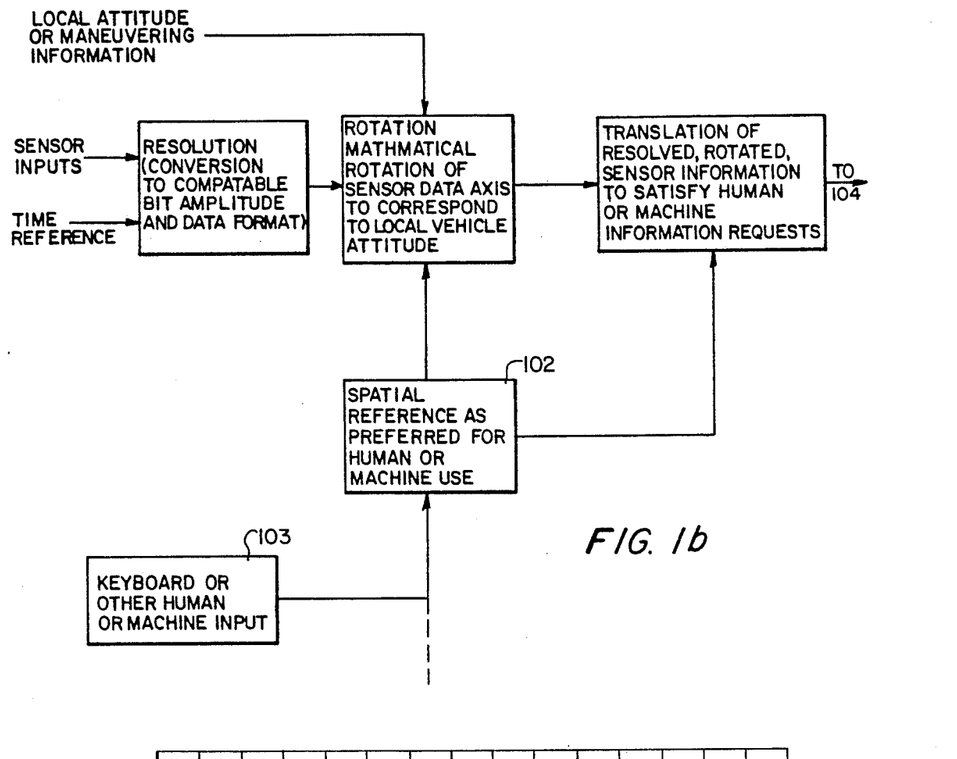
FIG. 1B is a functional detail enlargement of part of FIG. 1.

To further clarify how this is done, the FIG. $1_B$ is given to illustrate a breakdown of block 101 and 102 of FIG. 1.

The explanations of each box in $1_B$ show the function performed, which in general, is a mathmatical manipulation of the sensor input data, the vehicle maneuvering data, if any, and the desired human or machine input command via 103 and 102. An example of the input data could be for a human visual presentation of the host machines maneuvering, along with other compatible plat reference machines maneuvers in a view as seen from some chosen perspective angle or spatial reference.

A simplified example would be machines in a 3 dimension space being portrayed on a 2 dimensional display by spatial reference, along one of the cardinal directions. This is not to limit the invention to these special cases, but to only simplify, for more clarity in this description. It is obvious that more general spatial orientations can provide very useful displays that a human or machine could easily interpret, such as views at various angles, various perspectives, and various points of origin.

The Comparator and Encoding Unit 104 receives the refined local data and compares it to a Plat Reference Unit 105, so that a timing sequence can be ordered that is compatible with other similar Plat Reference Units within a remotely distributed system.

The Priority and Timing Controller 106, serves to integrate several inputs with the desired human and/or machine output. Its prime function is set by the input, at any given instant, of input 103.

One aspect of the function of Priority and Timing Controller 106 is to bring the refined local information from the Comparison and Encoding Unit 104, and apply it to the Presentation and Control unit 108, to supply output to the human and/or machine recipient.

Another aspect of Priority and Timing Controller 106 is to edit and censor the local information and then to transfer it, while maintaining the compatibility timing code, to the Output Unit 109, where it is transmitted via the common media output line 110, to other operating remote systems making up the parts of a distributed mapping and tracking system as is FIG. 1.

It is a further function of Priority and Timing Controller 106 to receive the inputs from other cooperating Plat Reference Units from input line 111 and Reception Unit 112, after they have been combined in Buffer unit 113, with predetermined and ordained inputs 114, that are set by a higher authority or limiter than the human and/or machine imput 103.

A further function of Priority and Timing Controller 106 is to accept and edit or censor the prediction output of Prediction Component Calculator unit 107, before allowing this information to be transmitted to Output Unit 109, and thence to other portions of a distributed system.

The prediction function of Prediction Comparent Calculation unit 107 is made of the human and/or machine local inputs and also the local sensors that can be used to anticipate a future result such as momentum and rate parameters.

DESCRIPTION OF A PREFERRED EMBODIMENT USING TWO PLAT REFERENCE

Figure 2:
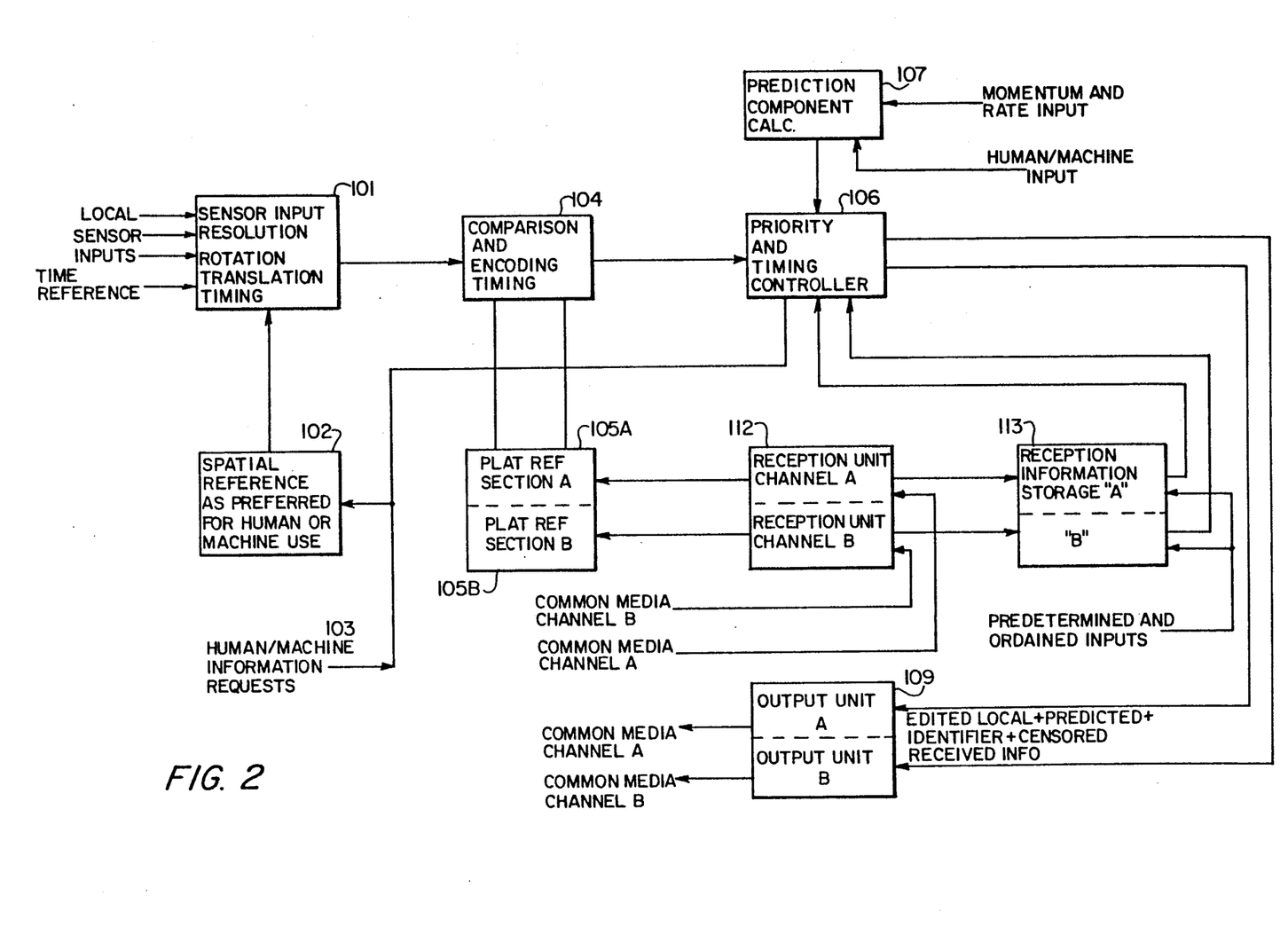
FIG. 2 is a block diagram of a preferred embodiment of the system of the present invention using two plat references.

FIG. 2 illustrated a preferred embodiment of the invention in the form of a plat reference block diagram adapted for using two plat references, and incorporated many of the components shown in FIG. 1 and described in connection with that embodiment.

Referring to FIG. 2, although several possible inputs from the outside scene or the location of the data sensor units are possible and typically used, one possibility as an example will be discussed in connection with FIG. 2, and FIGS. 3 through 6, to simplify the description. It will be understood that multiple inputs of various types are typical and will logically follow the same explanatory process. In this illustrated embodiment, the Sensor Input Resolution Unit 101 receives, for example, the output of a radio receiver connected to one of the local sensor inputs of the Sensor Input Resolution unit 101. This receiver is tuned to receive a radio carrier pulse of short duration at some predetermined carrier frequency. In the example, it will be assumed that three radio transmitters at known spatial locations transmit pulses at predetermined timing interval. The timing between the arrival of these pulses at the radio receiver and thence the input to Sensory Input Resolution Unit 101 contains the essential information to specify the location of the radio receiver relative to the known locations of the three transmitters.

Sensory Input Resolution Unit 101 takes this raw input and resolves it to the viewpoint or spatial reference as required by the operator or machine request input 103, and Spatial Reference Unit 102. For purpose of explanation, an example of this spatial reference input from Spatial Reference Unit 102 could be that reference viewpoint which is perpendicular to the plane that all three of the known radio pulse transmitters lie in. This examplarly spatial reference is one of the more common and is useful for clear explanation of this embodiment.

The mathematical processing circuits in Spatial Reference Unit 102 operate with the known factors, such as speed of propagation, distance of known transmitting stations each to the other, and the geometry involved, to mathematically factor, rotate and translate the undigested input of Sensor Input Resolution Unit 101 into a form prescribed by the human or machine input 103. In the example being followed, the result would be a set of numbers that describe the physical location of the receiving Sensor Input Resolution Unit 101 referenced to a perpendicular set of axes lying in the plane of the three pulse transmitting station.

It should be noted that the example given is of minimum complexity to provide clarity in this description. In the more generalized case, undigested inputs to Sensor Input Resolution Unit 101 would be more varied, such as power levels, pressure levels, vibratory frequencies, modulation patterns, time reference; all of which will be mathematically digested to yield the required viewpoint requested by human or machine input 103.

The information assimilated in Sensor Input Resolution unit 101 is transferred to the Comparison and Encoding unit 104, where it is compared to prescribed plat reference supplied from Plat Reference Unit 105. This plat reference is, for example, set in the same plane as the two axis reference of the exemplarly radio transmitters. This is not to confine and limit the description to that specific case, but is used here to simplify the description.

The plat reference is chosen to provide a non-interfering usage of the reception and output information within the common media as will be described herein. It is also chosen so that other noncompatible equipment and devices will neither respond nor interfere with any portions of these distributed plat reference system.

Figure 3:
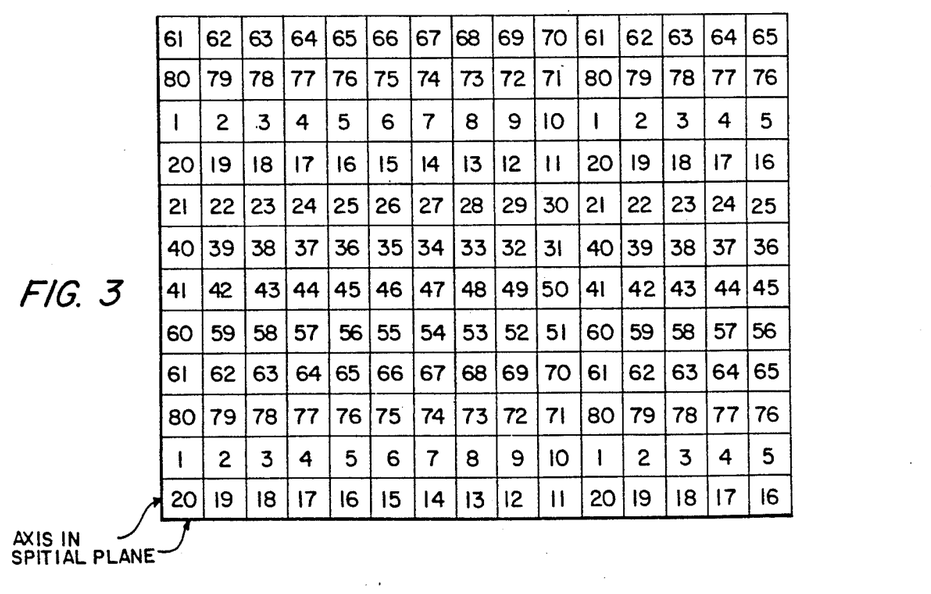
FIG. 3 illustrates an elementary example of plat reference information for the FIG. 1 embodiment of the invention.
Figure 4:
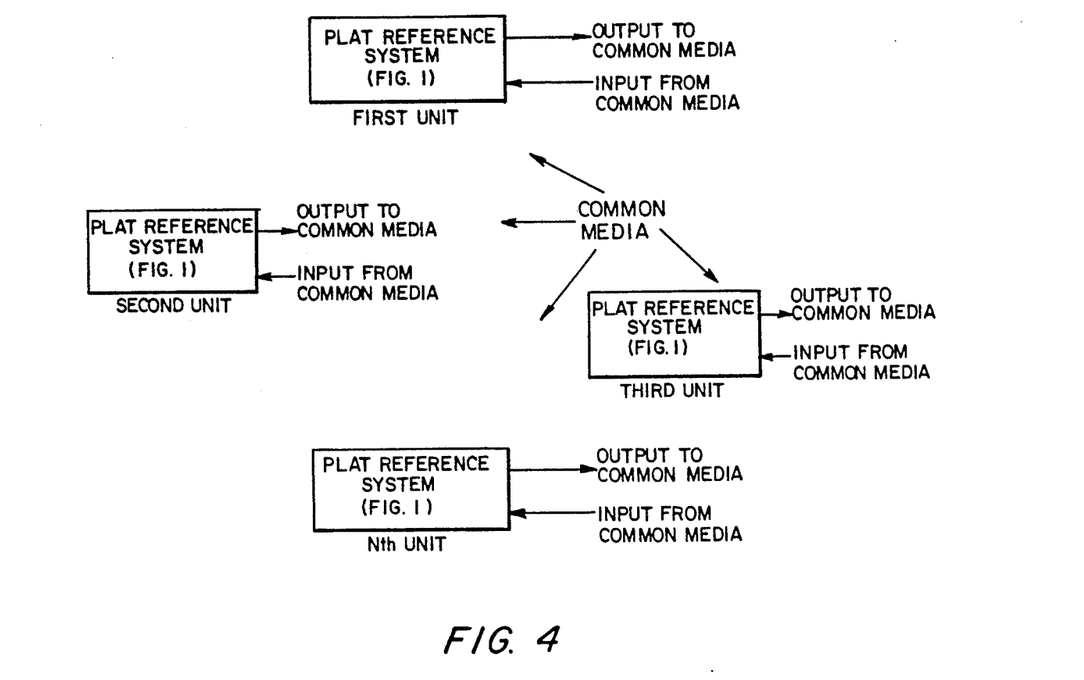
FIG. 4 is a diagrammatical illustration of a distributed system of multi plat reference units embodying the present invention.
Figure 5:
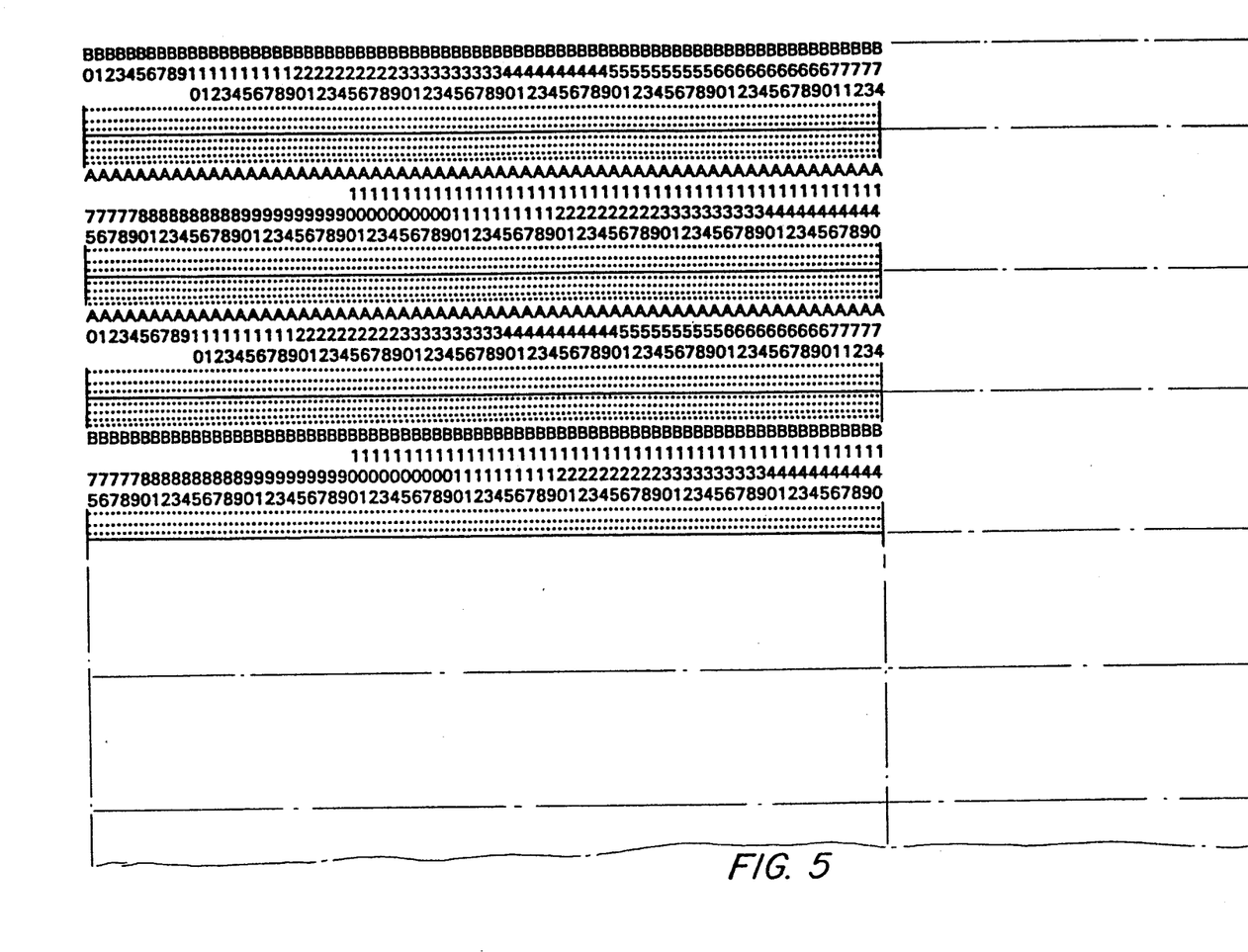
FIG. 5 is an example of a plat reference combination formed of two plat references.

An elementary plat reference example is shown in FIG. 3. It is a very elementary example of only one of many combinations available. The plat reference information may be instilled in the mapping and tracking device when it is constructed and left unchanged, or be made changeable from time to time for operational purposes. It is also to be noted that the axes associated with the plat reference may be any number.

The Comparison and Encoding Unit 104, compares the input from Sensor Input Resolution Unit 101 to the plat reference and extracts a corresponding time delay to use for sending an output into the common media. If the plat reference circuit is already being used at the selected plat reference location, then the Comparator and Encoding Unit 104 will move its choice to the closest unused position on the plat reference. This assures that the output to the common media does not interfere with an input from the common media.

FIG. 3 illustrates the repetitive pattern of the plat reference in Plat Reference Unit 105 when used to eliminate interference due to power levels into the common media and the attenuation factor of this media.

It is normal within a media used for the transmission of energy, such as that described here, to transport information, the intensity, or signal strength, typically decreases as the distance between the transmitter and point of measurement receptor increases. This weakening is typically caused by signal spreading, media attenuation, or other losses in the practical system.

If the transmitter of the radiation is such as to send energy in all directions in a 3 dimensional media, the weakening is proportional to the square of the distance or range. The actual weakening is usually somewhat greater than this, depending upon the lossiness of the conducting medium and other practical considerations.

These parameters, along with the power level of the transmitter and the sensitivity and noise level of the receptor define a workable maximum range, but not always in a precise fashion, when considering a working, practical system with component tolerances. This creates a range zone of uncertainty.

Figure 7:
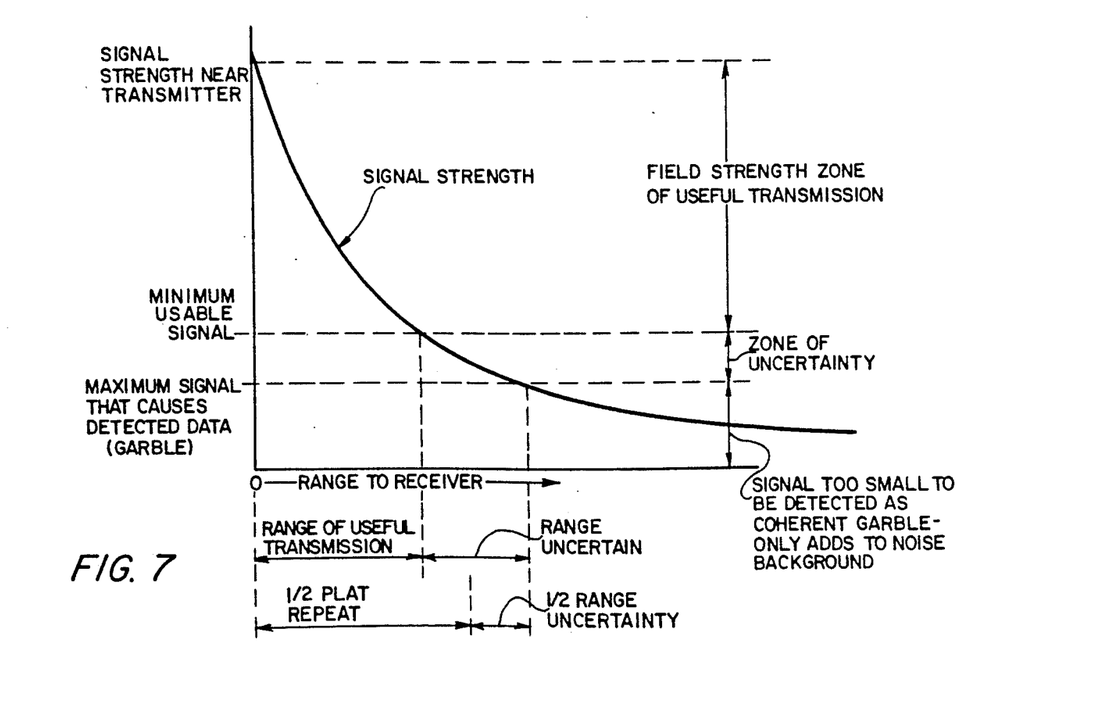
FIG. 7A is a plot of signal strength v. range illustrating reduction of signal strength with range and showing how a plat is constructed in its most elemental form.

FIG. 7 is shown to illustrate this and to describe how a plat reference is constructed in its most elemental form.

In the most general case, the area of system operation may be indefinitely large and use numerous repeats of the Plat Reference pattern. This is not to say that this invention requires more than one Plat Reference, but the embodiment here describes the plural case.

The embodiment here also describes a two dimensional plat, but a three dimensional or one dimensional case is covered by the description.

An important variant of this embodiment is shown in FIG. 2. The advantage of having the Plat Reference unit contain a dual or multiple level plat reference greatly increases the reliability of interconnection through the common media, and reduces the possibility of interference.

This variant is best described by considering the most elemental combination of two plat references. This would most simply be the same plat pattern interleaved with a duplicate of itself to create a double layer of timing choices to cause an output to two channels of the common media. This is shown in the block diagram FIG. 2 and in plat reference diagram FIG. 3 and timing diagram FIG. 6.

The Reception Unit 112 in FIG. 1 is divided into the two units $112_A$ and $112_B$ in FIG. 2. The Comparison and Timing unit 104 compares the local input with both the A and B layers of Plat Reference Section $105_A$ and chooses the closest match from each layer that is not occupied by an input from Reception Unit $112_A$ or $112_B$.

Once the time code corresponding to the plat reference selection is made, the first layer that causes an output to be transmitted to the common media also carries the timing information derived from the alternate Plat Reference Section $105_A$ or $105_B$. This causes the Priority Timing Controller 106 to verify that no reception information is intending to occupy the same time space of the alternat layer in the next time space. If this happens, the processor program in Priority and Timing Controller 106 will move the alternate plat reference layer choice to another position and prevent an interference of the anticipated incoming signal from the common media by an outgoing signal to the common media.

The choices made of where to assign the time delay if a timing space is filled by an existing signal from the Reception Unit, or an announced intention to fill on the alternate plate reference layer, is not critical. First choices are those closet to the exact value and then the closest available, either in the earlier or later possibilities. This is another virtue on making the system resistant to interference or overload.

Figure 6:
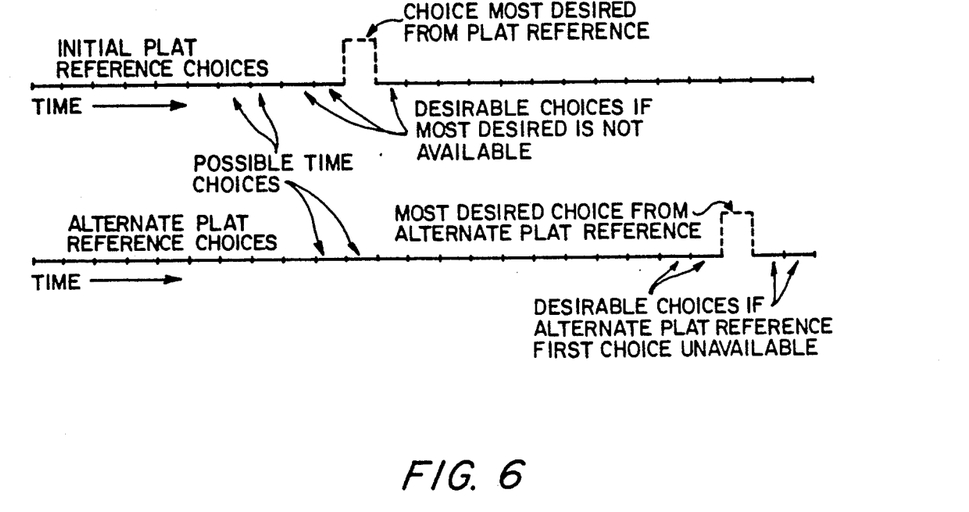
Figure 6A:
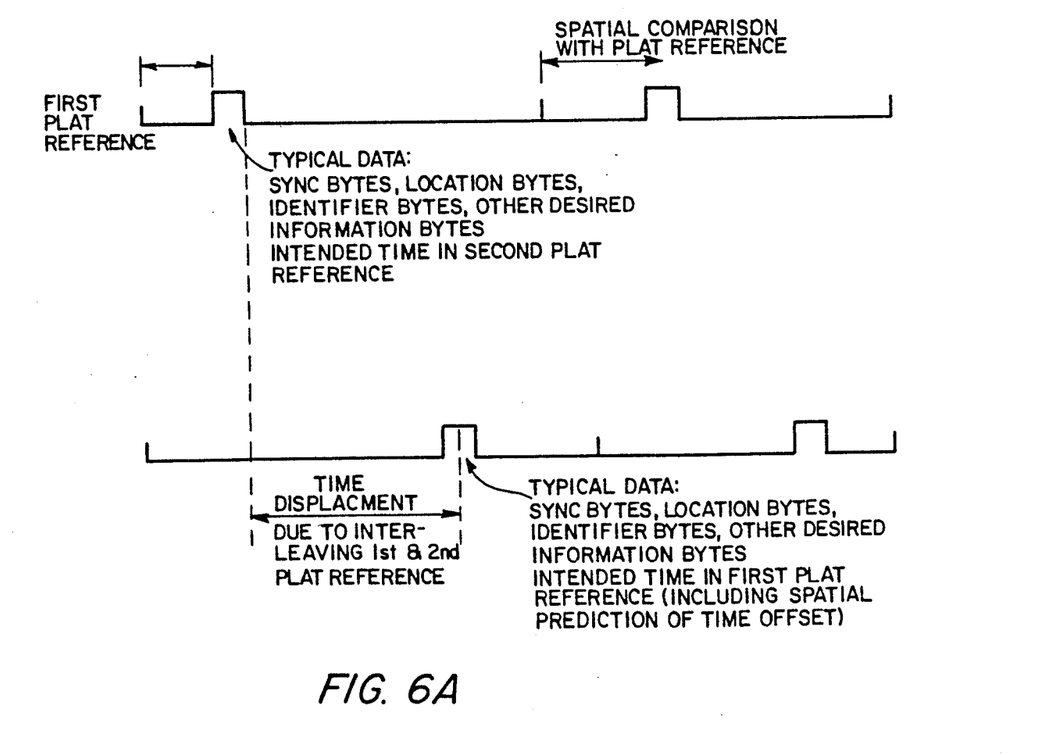

These timing choice diagrams are illustrated in FIG. 6.

Another input to the Priority and Timing Unit 106, as shown in FIG. 1, is the prediction component issuing from Prediction Component Calculation unit 107. The inputs to Unit 107 are from the local machine or human as direct commands, sensors of momentum, rate, acceleration, or the time related functions.

In the embodiment described here, only two inputs are used for simplicity. More inputs can be logically accommodated. These inputs are the velocity in the plane of spatial reference, taken from the local machine sensors and the acceleration, also in the spatial reference plane.

The Prediction Component Calculation Unit 107 mathematically uses the inputs to predict where the location which will be entering Comparison and Timing 104 will be, at a near time in the future. This anticipatory function is added to the information distributed to the remote portions of the distributed mapping and tracking system which enchances the information of all corresponding human and machine outputs from unit 108.

The Common Media Reception unit 112 receives during all time units except when it is disabled by an output from its affiliated local Output unit 109. In the variant described above herein, the alternate Output unit and Alternative Reception unit are timed by the Alternate Plat Reference, such that one or the other Reception units, $112_A$ or $112_B$, are operative at all times.

The output of the Reception unit containing received information is fed to the remote and Synthetic Storage Buffer 113. This buffer both stores the information in a temporary memory for computing convenience by Controller 106, and provides an input and storage of local and prescribed information that is deemed as limits or of higher importance than what may or may not be received by Reception unit 112.

A second output of the Reception unit 112, is sent to the Plat Reference unit 105, so that the selection of an unused reception time is accommodated.

The Common Media Output unit 109, is supplied with information by Priority and Timing Controller 106. This information is comprised of that local information that is desired to be disseminated to the distributed members of the mapping and tracking system, and the desired predictive information, and also an identification factor, to allow the remote recipients of the information to place it in proper order.

It is noted here that another function of the Plat Reference unit is to include in the outgoing information, a censored and selected portion of the information from the Common Media via Reception unit 112.

Here is the computing sequences used in a simplified example for computing time delay for a dual plat reference system.

First Sequence
  Taking local spatial sensor information rotate coordinates into a plane of two dimensional dual plat reference previously stored in memory.
Second Sequence
  Compare local spatial sensor information with first plat reference and retrieve most desired delay setting.
Third Sequence
  Observe input from local second common media receiver over previous time cycle to see if desired time delay of second sequence was designated by any remote plat reference system for use in upcoming time cycle in first plat reference.
Fourth Sequence
  If match with desired time delay and outside designated delay is found, revert to closet early or late delay choice. (FIG. 6) If no match is found, select desired choice of second sequence transmission in first plat reference common media.
Fifth Sequence
  Calculate local accelleration and momentum inputs to predict spatial location at time of time cycle for second plat reference.
Sixth Sequence
  Using results of fifth sequence, compare spatial predicted result with second plat reference and retrieve most desired delay setting.
Seventh Sequence
  Observe input from local first common media receiver for first plat reference over previous time cycle to see if desired time delay was designated for intended use by any outside plat reference system during upcoming time cycle in second plat reference.
Eighth Sequence
  If match with desired time delay and remote designated delay is found, revert to closest early or late delay choice. (FIG. 6) If no match is found, select desired choice of sixth sequence for transmission in second plat reference common media.
Ninth Sequence
  Cause transmission on first common media output at chosen time delay. Include in this transmission the relevant synchronization, identification, pertinent system data, and intended time delay for transmission in next time cycle for second common media output.
Tenth Sequence
  Calculate local acceleration and momentum inputs along with spatial inputs to predict spatial location at time of time cycle for first plat reference.
Eleventh Sequence
  Using results of fifth sequence, compare spatial predicted result with first plat reference and retrieve most desired delay setting.
Twelfth Sequence
  Observe input from common media receiver for second plat reference over previous time cycle to see if desired time delay was designated for intended use by any outside plat reference system during upcoming time cycle in first plat reference.
Thirteenth Sequence
  If match with desired time delay and remote designated delay is found, revert to closest early-late delay choice. (FIG. 6) If no match is found, select desired choice for transmission in first plat reference common media.
Fourteenth Sequence
  Cause transmission on second common media output at chosen time delay. Include in this transmission the relevant synchronizing, identification, pertinent system data and intended time delay for next transmission in next time cycle for first common media output.
Fifteenth Sequence
  Repeat sequence five through sequence fourteen again and again.

The final output of the system is information in a clear and complete form to be delivered either to a human being, a machine receptor, or both. This is done by the human presentation and Machine Control unit, 108. The human output would generally be of visible or audible information, while the machine output would be selected to harmonize with the machine requirements.

It can be seen from this description that the examples chosen were simplified for descriptive clarity, but do not limit the broad functions of the invention.

I claim:

1. A plat reference system to control a multidirectional flow of energy through a common media in a multidimensional space, between a first plat reference system and an unprescribed plurality of other plat reference systems, each using a common plat reference, said plurality of other plat reference systems having variable spatial locations and movements in said multidimensional space, said plat reference system comprising:

means for selecting mathematical information specifying said common plat reference;

means within said multidimensional space for emitting into said common media energy of known approximate intensity and approximate propagation characteristics;

means for encoding information into said emitted energy;

means for determining a spatial location of said emitter within said multidimensional space;

means to correlate said location with said plat reference, to form a plat reference correlation;

means to determine from said plat reference correlation a time of emitting energy;

means to determine from said plat reference correlation a time for reception of energy;

means for receiving energy from said common media;

means for detecting information from said received energy; and means for displaying said information to a human being or machine interface.

2. A plat reference system as in claim 1, further comprising:

means to display information received from said plurality of other plat reference systems to pictorially depict spatial locations of said other plat reference systems within said multidimensional space.

3. A plat reference system as in claim 2, further comprising:

means to display spatial location information received from said plurality of other plat reference systems, said spatial location information to be displayed as a view translated through the multidimensional space distant from the spatial location of said first plat reference system.

4. A plat reference system as in claim 2, further comprising:

means to display spatial location information received from said plurality of other plat reference systems, said spatial location information to be displayed as a view rotated about one or more reference axes of the spatial multidimensional space.

5. A plat reference system as defined in claim 1, further comprising:

means to control a multi-directional flow of energy through the common media comprising:

(a) means to establish an instantaneous location of an emitter of energy moving in the multidimensional space;

(b) correlation means to correlate said instantaneous location with the plat reference;

(c) means to derive a time for sending out of energy by said moving emitter; and (d) means to derive a time for reception of energy.

6. A plat reference system as defined in claim 1, further comprising:

means for said first plat reference system to accept information from a human being;

means to encode said information into said emitted energy from said first plat reference system; and means to decode information received by said receiving means.

7. A plat reference system as defined in claim 1, further comprising:

means to determine a next plat reference time correlation as said spatial location changes to a next location within said multidimensional space.

8. A plat reference system as defined in claim 1, further comprising:

means for emitting energy by radio transmission and receiving energy by radio reception, both of a common radio frequency.

9. A plat reference system as defined in claim 8, further comprising:

means for using said determined spatial location within said multidimensional space to determine a second plat reference different from said first plat reference;

means for correlating said second plat reference to determine a second time for sending out energy and a second time for receiving energy;

second means for emitting energy by radio transmission on a second radio frequency; and second means for receiving radio energy on said second radio frequency.

10. A plat reference system as defined in claim 1, wherein:

said correlation means comprises means to correlate said determined location with a plurality of plat references, each controlling respective times for sending and receiving signals.

11. A plat reference system as defined in claim 9, wherein:

said second plat reference coordination information is included in information received by said first receiver of energy; and coordination information for said first plat reference is included in information received by said second receiver of energy.

12. A plat reference system as defined in claim 9, wherein:

means of coordination of first plat reference is according to said common plat reference information; and means of coordination of second plat reference is according to information included in that received by said first receiver of energy.

13. A plat reference system as defined in claim 9, wherein:

said information received provides means to select times for emitting energy, and includes means for including in said emitted energy information denoting a next intended time of emitting energy.

14. A plat reference system as defined in claim 1, further comprising:

means to coordinate the time of future transmissions of energy with said plat reference using means referenced to previous receptions of energy.

15. A plat reference system as defined in claim 1, further comprising:

means for selecting information from said detected information and emitting said selected information encoded into said emitted energy.

16. A plat reference system as defined in claim 1, further comprising:
means for emitting said emitted energy by optical transmission and receiving said received energy by optical reception, said transmission and reception being of a common optical spectral band.

17. A plat reference system as defined in claim 1, further comprising:
means for emitting mechanical vibratory energy into a common media, means for receiving mechanical vibratory energy from said common media, said emitted and received vibratory energy being of a common vibratory frequency band.

18. A plat reference system as defined in claim 1, further comprising:
means for accepting sensor information;
means for translating and rotating said sensor information about sensor information reference axis;
means for receiving information from said receiver of energy to control said means of sensor information rotation and translation; and
means encoding said rotated and translated information into said emitted energy.

* * * * *